United States Patent
Knoer et al.

[15] 3,644,179
[45] Feb. 22, 1972

[54] METHOD AND APPARATUS FOR CONTINUOUS FRACTIONATION OF TALL OIL AND SIMILAR MIXTURES OF ORGANIC SUBSTANCES WITH PRELIMINARY PLURAL STAGE THIN FILM EVAPORATION

[72] Inventors: Peter Knoer, Zurich, Switzerland; Gerhard Pieh, Krems an der Donau, Austria

[73] Assignees: Krems-Chemie Gesellschaft m.b.H., Krems an der Danube, Austria; Lurva A.G., Zurich, Switzerland

[22] Filed: Sept. 23, 1968

[21] Appl. No.: 761,774

[30] Foreign Application Priority Data

Sept. 28, 1967 Austria ..............................A8825/67

[52] U.S. Cl..................................203/72, 203/78, 203/84, 203/89, 202/236, 202/154, 202/155, 202/153, 260/97.6, 260/97.7
[51] Int. Cl.......................................................B01d 3/18
[58] Field of Search..........................203/72, 89, 78, 84, 91; 202/154, 155, 153, 236; 260/97.6

[56] References Cited

UNITED STATES PATENTS

| | | | |
|---|---|---|---|
| 2,724,709 | 11/1955 | Spence | 202/154 |
| 2,733,195 | 1/1956 | Miller | 202/154 |
| 2,886,492 | 5/1959 | Hanson et al. | 202/154 |
| 2,894,880 | 7/1959 | Sisson et al. | 203/72 |
| 2,895,886 | 7/1959 | Schneider | 203/72 |
| 3,092,587 | 6/1963 | Ester et al. | 203/72 |
| 3,420,750 | 1/1969 | Schaefer et al. | 203/72 |
| 3,496,071 | 2/1970 | Spence | 203/72 |
| 2,520,870 | 8/1950 | Wood et al. | 203/72 |

FOREIGN PATENTS OR APPLICATIONS

| | | | |
|---|---|---|---|
| 144,501 | 3/1962 | U.S.S.R. | 203/89 |
| 900,457 | 7/1962 | Great Britain | 203/72 |

*Primary Examiner*—Wilbur L. Bascomb, Jr.
*Attorney*—Jacobi, Davidson & Kleeman

[57] ABSTRACT

Method and apparatus for continuous fractionation of tall oil and similar mixtures of organic substances containing components prone to react upon heating. One or more fractionating columns are utilized to separate the mixture into at least two main fractions, for example, a rosin acid fraction and a fatty acid fraction with a pretreating device comprising an evaporator, a fractionating column and a condenser. The evaporator of the pretreating device and the evaporator which precedes the first fractionating column are both thin film evaporators whereby evaporation occurs so quickly as to avoid reaction of the components of the light and heavy ends of the mixture which are otherwise prone to react upon heating. Preferably, a pair of fractionating columns are utilized, the first serving as a rosin acid distilling column and the second serving as a fatty acid distilling column, with the bottoms from the first fractionating column being recycled to the evaporator which precedes the first fractionating column to subject the same to further evaporation and fractionation. Improved yield and improved quality of yield are found.

9 Claims, 1 Drawing Figure

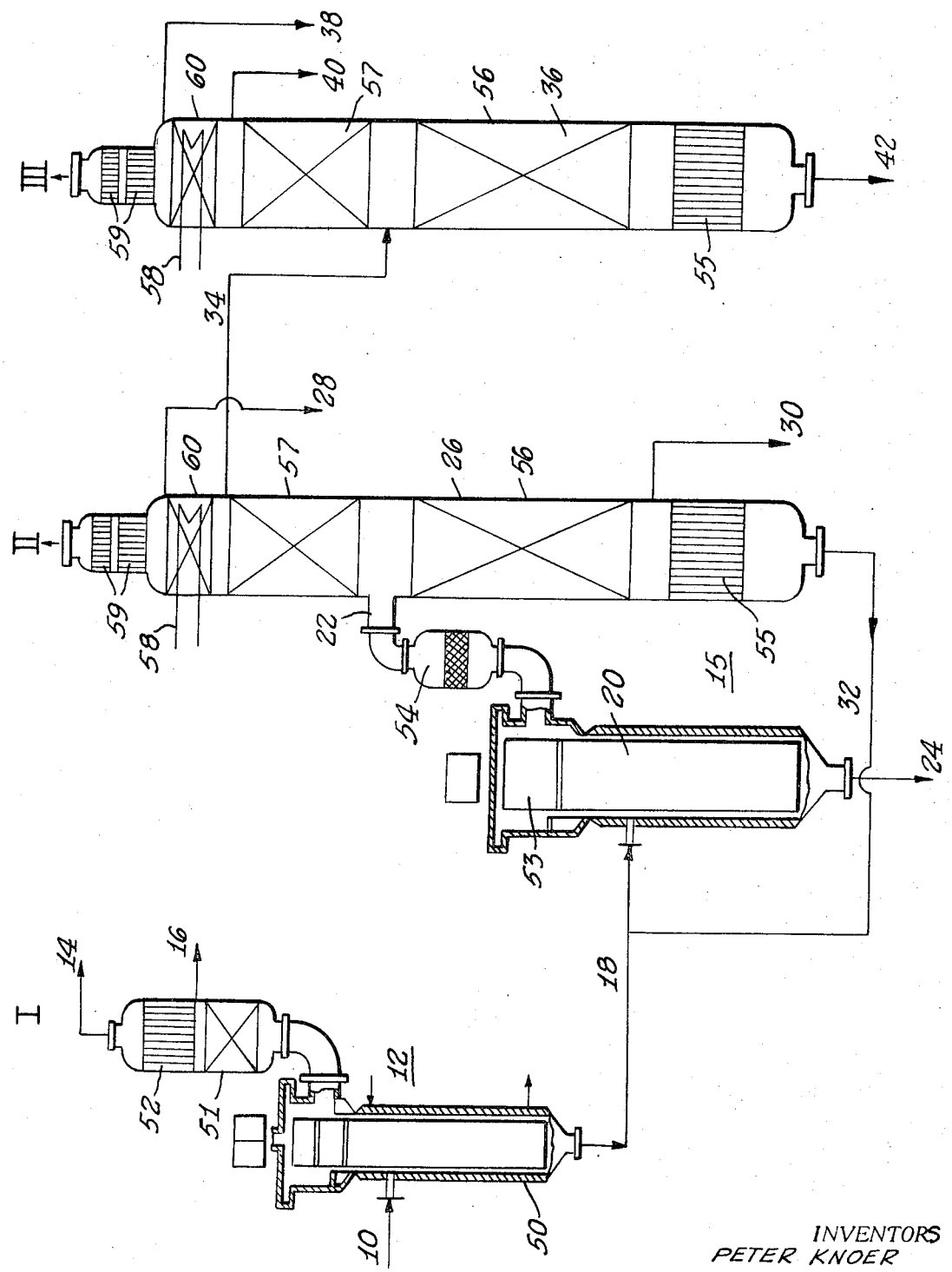

METHOD AND APPARATUS FOR CONTINUOUS FRACTIONATION OF TALL OIL AND SIMILAR MIXTURES OF ORGANIC SUBSTANCES WITH PRELIMINARY PLURAL STAGE THIN FILM EVAPORATION

This invention relates to a method and apparatus for continuous fractionation of tall oil and other or similar mixtures of organic substances which contain components prone to react upon heating and relates more particularly to such a fractionation wherein thin film evaporators are utilized both immediately in advance of the first fractionating column and in a pretreating device, the thin film evaporators causing evaporation so quickly as to avoid reaction of the components of the light and heavy ends of the mixture as would otherwise be prone to react upon heating. By this high-speed evaporating technique greater yields of the desired main fractions, for example, the rosin acid fraction and the fatty acid fraction, are realized, and, moreover, these fractions each have a better quality than would be otherwise obtainable.

Ordinarily, during the distillation of tall oil and similar complex mixtures of organic compounds by prior art techniques, some of the valuable constituents such as the rosin acids and the fatty acids are lost due to the formation of high-boiling substances. Thus, it is known that in tall oils and other similar mixtures of organic substances there are components which react with the desired end products to form compounds of increased molecular weight, for example, by esterification, thereby reducing the yield and quality of the main fractions resulting from fractionation.

Several prior art techniques are known for separation of mixtures of rosin and fatty acids into various fractions by distillation. According to one of these prior art techniques the pitch residue is removed from the tall oil as a main fraction by thin film evaporation of all the other components, that is, of the rosin acids and the fatty acids as well as the light ends. The evaporated mixture of rosin acid, fatty acids and light ends is passed into a fractionating column for separation of the mixture into a fraction containing the light ends together with the fatty acids and into a rosin acid fraction. The rosin acids thus appear in the bottoms of this column. The tops are passed into a second column in which they are further separated into light ends and the fatty acid fraction. The yield of valuable fractions, that is, the rosin acids and the fatty acids, obtained by this method is, however, relatively low because, as has been found heretofore, a relatively large part of the pitch residue is formed by reactions of relatively more volatile substances during the evaporation procedure. As all of the light ends are passed through both fractionating columns, certain components of the light ends react with the rosin acids and with the fatty acids thereby impairing the quality of the reaction products. These reactions take place due to the high temperatures and long residence time of the materials in the distillation equipment.

According to another prior art technique for continuous fractionation of tall oil and other such mixtures of organic substances, unsaponifiable components are topped off in a column from the multiple mixture and the bottoms from the topping column are passed into a fractionating column in which the fatty acids as well as some additional unsaponifiable matter are fractionated off. The residue is passed into an expansion chamber in which the rosin acids are flashed off the practically nonvolatile residue, called "pitch."

It has now been found that even in this method undesirable reactions take place in the topping column in spite of the relatively low-temperature prevailing therein. These reactions take place between certain constituents of the light ends and the valuable rosin acids and unsaturated fatty acids, respectively. Certain constituents of the native heavy ends also react with the valuable rosin acids and fatty acids thus further reducing the yield.

The discovery that both these reactions still take place at the moderate temperatures in question, but can be avoided by applying thin film evaporation with extremely short heating contact, was quite unexpected since it had heretofore been believed that the use of thin film evaporators was beneficial only at such temperatures that the residue withdrawn became unstable. However, in the case at hand, the volatile component reacts and it was not even known heretofore that, in fact, this component did react at the comparatively low temperatures of the topping column referred to. Still less could it be expected that the use of a thin film evaporator at this stage, which as will be pointed out hereinafter is one of the features of the instant invention, would lead to the distinct improvement of the instant invention.

Thus, a primary object of the instant invention is the provision of a method and apparatus for continuous fractionation of tall oil and other similar mixtures of organic substances which reduces the loss of valuable constituents normally occuring during the distillation by the formation of high-boiling substances.

Another object of this invention is to provide a method and apparatus of the type described which improves the quality of the main fractions recovered which, in the case of tall oil, would consist chiefly of fatty acids and rosin acids.

Still another object of the instant invention is the provision of a method and apparatus for continuous fractionation of tall oil and similar mixtures of organic substances containing components which are prone to react with certain of the valuable constituents during distillation to form compounds of increased molecular weight, for example, by esterification, wherein a first evaporating step is utilized for removal only of the light ends and a second evaporating step is utilized for removal of the heavy ends, for example, the pitch residue by evaporation of the remainder of the distillable components, for example, the fatty acids and the rosin acids, with these evaporated or distillable components being subsequently separated into at least two main fractions, one of which includes primarily the rosin acids and the other of which includes primarily the fatty acids, with these two evaporation steps taking place in thin film evaporators to minimize the time thereby preventing reaction of the valuable constituents of the mixture with such unsaponifiable constituents of both the light and heavy ends as are prone to react during prolonged contact. The mixture of valuable components evaporated in this second thin film evaporator may then be rectified in at least one fractionating column.

Other and further objects of the instant invention will be obvious from the following detailed description and will become apparent by reference to the accompanying drawing which schematically shows a flow diagram of the preferred method and apparatus to be used in the instant inventive concepts.

The compounds or constituents which are prone to react during prolonged contact under heating may, for example, be phenols and terpene alcohols in the light ends and wax alcohols in the heavy ends. In this connection it should be emphasized that tall oil contaminated with components from birch wood as will occur if birch and pine are used for producing cellulose in the same plant, is particularly rich in phenolic and other reactive components which may react with the valuable rosin acids and fatty acids thus reducing their yield. Therefore, the present invention is of particular importance when such obnoxious types of tall oil are to be distilled.

According to the preferred technique of the instant invention the yield as well as the quality of the valuable products obtained can be improved still further by treating the bottoms of the first fractionating column, consisting chiefly of rosin acids in which, however, high-boiling components accumulate which partly may have been entrained in the vapors from the second thin film evaporator and partly may have been formed in the fractionating column itself by condensation and/or polymerization reactions, in still another thin film evaporator and subjecting the vapors therefrom to yet another fractionation step. This may be effected most simply by recycling the bottoms from the first fractionating column to the feed for the second thin film evaporator.

In the prior art technique referred to previously in which the light ends are separated in the first step the temperature utilized is between 190° and 195° C. with a pressure of from between 35 and 65 mm. Hg and a residence time in the topping column of between about 3 and 5 minutes. The light ends removed by this distillation technique amounted to about 6 percent of the crude tall oil feed and contained 35 percent of reactive substances capable of forming heavy ends by reacting with the more valuable constituents of the tall oil components. When the same proportion of light ends was removed from the same tall oil according to the method of the instant invention under approximately the same conditions of temperature and pressure, but in a thin film evaporator in which the time of residence was only between about 3 and 10 seconds, preferably about 4 seconds, these light ends contained as much as 70 percent of reactive substances capable of forming heavy ends with the other, more valuable, constituents of the tall oil. Consequently, the losses of valuable fatty acids and rosin acids by reaction with the reactive substances in the light ends was practically eliminated. The increase in yield of these valuable products achieved in this manner amounted to more than 2 percent of the crude tall oil feed.

The preferred apparatus for carrying out the method of the instant invention comprises at least one, and preferably several, fractionating columns in series, each column being provided with an outlet for the bottoms product, the overall system including a pretreatment device before the first fractionating column which may consist of an evaporator, a fractionating and a condenser and, as mentioned previously, the evaporator of the first fractionating column as well as the evaporator of the pretreatment device, according to this invention, are both thin film evaporators.

If tall oil is to be distilled the apparatus consists of at least two fractionating columns arranged in series, the first one of which serves as a distillation column for recovery of the rosin acids and the second one of which serves as a distillation column for recovery of the fatty acids. The fractionating columns may, above their main rectifying section, be provided with a condenser, further rectifier and additional or final condensers. In this manner, it is possible to achieve a very considerable enrichment of the more volatile components, for example, of the remainder of the unsaponifiable material, of low molecular weight fatty acids, etc.

The main portion of these enriched compounds can be withdrawn separately from the rosin acids in the first fractionating column, that is, in the rosin acid distillation step.

In order to remove the heavy end components which partly may consist of entrained native pitch and partly of newly formed high boiling products from the bottom material, the mixture collected at the bottom of the stripping section of the first fractionating column may be withdrawn and is preferably returned into the thin layer evaporator arranged in advance of the entrance to the first fractionating column.

By utilizing the techniques of the instant invention it is possible to greatly reduce the quantity of the heavy ends which must be removed from the plant and to increase the quantity of normally distillable components. A comparison with prior art methods for distillation of tall oils shows that the quantity of heavy ends is considerably reduced by the techniques of the instant invention. Thus, by processing the same tall oil feed, the quantity of heavy ends was reduced from 20 percent by the conventional techniques to 14 percent by utilizing the methods of the instant invention.

Reference is now made to the accompanying drawing wherein the sole FIGURE shows schematically a process diagram or flowsheet of the preferred method and apparatus according to the instant invention.

The crude product, for example, tall oil, is passed through line 10 into the first evaporating stage I, that is, an apparatus 12 which has here been shown to comprise a thin film evaporator 50, such as a Luwa evaporator, a rectifier 51 and a condenser 52. In this evaporator 50 the crude feed is subjected for a time of between about 3 and 10 seconds, preferably about 4 seconds, to a temperature of between about 150° and 250° C., preferably about 180° C. In this pretreating apparatus 12, the feed is deodorized and degassed, and water and the light ends are removed by fractionation. The malodorous substances, the gas and the most volatile compounds of the light ends as well as the water are withdrawn through line 14 from the pretreating device 12. The main portion of the relatively easily vaporized components of the light ends which accumulate in the fractionating column of the pretreating device 12 is withdrawn through the line 16.

The residual mixture containing the heavy ends and intermediate constituents which has been pretreated in the manner described is fed through line 18 to the treating step II. This is carried out in an apparatus 15 including a thin film evaporator 20 and separators 53 and 54 and a fractionating column 26 provided with several condensers 58 and 59, thin film evaporator means 55 and separators that is to say, stripper means 56 and rectifier means 57, 60 incorporating a main rectifier 57 and further rectifier 60. In apparatus 20 the normally vaporizable components of the mixture are separated from the heavy ends which are withdrawn as residue through line 24. The vapors formed pass through the separators 53 and 54 into the fractionating column of the apparatus column 26. In the stripping section 56 of this column a fraction is accumulated and withdrawn through line 30, this fraction being rich in rosin acids. Heavy ends, whose components either may have been entrained in the vapors entering through line 22 or may have been formed anew in the fractionating column 26 are accumulated in the lowest part of this column together with a considerable percentage of rosin acids and are preferably withdrawn from the bottoms outlet and returned through line 32 to the inlet side of thin film evaporator of apparatus 20. Thus, in effect, these bottoms are recycled.

In the rectifying section incorporating the main rectifier 57 of the fractionating column 26, another fraction is accumulated and partly condensed by a condenser 58, the condensate being removed through line 34. The uncondensed part of the vapors is rectified by the further rectifier 60 in the uppermost part of the column, condensed and withdrawn through line 28.

A further treatment step III may be included and is preferred. With such an embodiment the apparatus may be arranged exactly like the apparatus for treatment step II, like reference numerals thus being generally used for the same or analogous components, with the feed to the fractionating column 36 being shown as the distillate 34 from the fractionation column 26, although the fractions withdrawn through lines 28, 30 or 34 may be further fractionated by passing one or more of them into the apparatus 36. The various fractions removed in the fractionating column 36 are designated by the lines 38, 40 and 42.

In order to more fully appreciate the instant inventive concepts the following Example is set forth as illustrative:

EXAMPLE

A mixture of rosin acids and fatty acids, viz tall oil, was treated according to the invention in an apparatus of the type shown in the flowsheet accompanying this application and the products obtained from such treatment were measured and analyzed.

The results are shown in the table below. These results are designated according to the feed and withdrawal lines, respectively, from which the samples were taken.

TABLE

| | Feed and withdrawal lines according to the flow sheet | | | | | | | | | | |
|---|---|---|---|---|---|---|---|---|---|---|---|
| | 10 | 14 | 16 | 18 | 24 | 28 | 30 | 34 | 38 | 40 | 42 |
| Quantity (kg./h.) | 28.5 | 0.6 | 1.1 | --- | 4.0 | 0.8 | 12.3 | --- | 0.3 | 8.0 | 1.4 |
| Yield, percent | | 2 | 4 | --- | 14 | 3 | 43 | --- | 1 | 28 | 5 |
| Analysis, percent: | | | | | | | | | | | |
| H$_2$O | | 2 | | | | | | | | 2 | 1 |
| US | 16.8 | | | | | | 4 | | | 97 | 49 |
| FA | 38.2 | | | | | | 3 | | | 1 | 50 |
| RA | 43.0 | | | | | | 93 | | | | |
| Average | 142 | | 90 | | 28 | 100 | 172 | | 125 | 195 | 182 |

US = Unsaponifiable Matter
FA = Fatty Acids
RA = Rosin Acids
AV = Acid Value

Obviously, it is possible to operate the apparatus according to the instant invention by collecting the fractions from lines 28 and 34 in separate tanks. These fractions can be separated into further fractions by again treating them separately in the same apparatus 12, 20 and 26.

In order to avoid even further the danger of adverse influence of high temperature, the use of steam as entraining agent may be considered, whereby the lowering of the partial pressure reduces the temperature of evaporation.

The instant invention, while primarily directed to the method and apparatus disclosed herein, also includes the various products resulting from the use thereof such as the fatty acids, the rosin acids and the distilled tall oil cuts, since these are products of a higher yield and quality than has been known with prior art techniques and apparatus.

It will now be seen that there is herein provided improved methods and apparatus for the continuous fractionation of tall oil and other similar mixtures of organic substances which satisfy all of the objectives of the instant invention including many advantages of great practical utility and commercial importance. Accordingly,

What is claimed is:

1. A method for the continuous fractionation of tall oil containing components prone to react upon heating, and including light ends, heavy ends, and intermediate constituents, comprising the steps of:
   a. continuously introducing said tall oil into a first thin film evaporation zone, withdrawing light ends from said evaporation zone, evaporation in said first evaporation zone proceeding at a rate sufficient to substantially avoid reaction of said light ends with the remaining fractions of the tall oil,
   b. continuously discharging a first tall oil fraction comprising heavy ends and intermediate constituents from said first evaporation zone and introducing said first tall oil fraction into a second thin film evaporation zone, withdrawing heavy ends from said second thin film evaporation zone, the evaporation in said second zone proceeding at a rate sufficient to substantially avoid reaction of said heavy ends with the intermediate constituents, continuously discharging a second tall oil fraction comprising intermediate constituents which are substantially devoid of said heavy ends from said second thin film evaporation zone, and introducing said second tall oil fraction into at least one fractionation zone wherein said second tall oil fraction is separated into at least a first fraction comprising rosin acids and a second fraction comprising fatty acids.

2. The method of claim 1 wherein said distillate from the second evaporation zone is initially fractionated to remove therefrom said first fraction in a first fractionation zone, said distillate having entrained therein some high boiling components and further high boiling components being formed in said first fractionation zone, said high-boiling components accumulating together with a portion of said rosin acids in the bottoms from said first fractionation zone, said bottoms being subjected to a further thin film evaporation, the vaporized portion of the further evaporation step also being subjected to fractionation.

3. The method of claim 2 wherein said bottoms are recycled and are admixed with said first tall oil fraction from said first evaporation zone.

4. The method of claim 1 wherein said first evaporation zone is operated at a temperature of between about 150° and 250° C. and a residence time of between about 3 and 10 seconds for said tall oil.

5. The method of claim 4 wherein said temperature is about 180° C. and said residence time is about 4 seconds.

6. An apparatus for the continuous fractionation of tall oil including light ends, heavy ends, and intermediate constituents thereof, said apparatus comprising in combination
   a. a pretreating device comprising a thin film evaporator, a rectifier and a condenser, all in flow communication, said thin film evaporator having an inlet means for the introduction of a tall oil feedstream, and an outlet means for discharging the remaining intermediate and heavy ends after evaporation of the light ends,
   b. a second thin film evaporator having an inlet means and an outlet means, means for connecting said outlet means of said first thin film evaporator with said inlet means of said second thin film evaporator, said outlet means of said second thin film evaporator providing a means for withdrawing the heavy ends, and
   c. a fractionating column having an inlet means in communication with said second thin film evaporator for receiving the intermediate constituents, said column having an outlet means for withdrawing bottoms.

7. The apparatus of claim 6 wherein fractionating columns are arranged in series, said first fractionating column serving as a rosin acid distilling column and the second fractionating column serving as a fatty acid fractionating column.

8. The apparatus of claim 6 wherein said first fractionating column includes a main rectifying section, condenser means, a further rectifying section and final condensers.

9. An apparatus for the continuous fractionation of tall oil containing components prone to react upon heating and including light ends, heavy ends, and intermediate constituents, comprising in combination, a pretreating device including at least a thin film evaporator and condenser, a second thin film evaporator having an inlet means and an outlet, means for operatively connecting in flow communication said pretreating device with said inlet of said second thin film evaporator, at least one fractionating column, means for operatively connecting in flow communication said outlet of said second thin film evaporator with the first of said fractionating columns, said fractionating column having an outlet for bottoms, means for recycling the bottoms from said outlet of said fractionating column to said inlet of said second thin film evaporator preceding said fractionating column, and wherein at least the major portion of the light ends of said mixture are removed from said mixture by evaporation in said pretreating device and at least the major portion of said heavy ends are removed from the remaining mixture by evaporation of said intermediate constituents in the thin film evaporator preceding said fractionating column, such evaporation in said thin film evaporator occurring at a rate which substantially avoids reaction of the components of said light and heavy ends with the intermediate constituents that are prone to react upon heating.

* * * * *

UNITED STATES PATENT OFFICE
CERTIFICATE OF CORRECTION

Patent No. 3,644,179                    Dated February 22, 1972

Inventor(s) Peter Knoer and Gerhard Pieh

It is certified that error appears in the above-identified patent and that said Letters Patent are hereby corrected as shown below:

One of the Assignees is incorrectly listed as "Lurva A.G., Zürich, Switzerland". This should be "Luwa A.G., Zürich, Switzerland".

Signed and sealed this 11th day of July 1972.

(SEAL)
Attest:

EDWARD M. FLETCHER, JR.                ROBERT GOTTSCHALK
Attesting Officer                      Commissioner of Patents